United States Patent [19]

Kummer

[11] Patent Number: 4,745,880
[45] Date of Patent: May 24, 1988

[54] MILKMETER FOR DETERMINING THE WEIGHT OF THE QUANTITY OF MILK ISSUED BY A COW DURING MILKING

[75] Inventor: Jan Kummer, Leeuwarden, Netherlands

[73] Assignee: Kummer Electronics B.V., Leeuwarden, Netherlands

[21] Appl. No.: 921,617

[22] Filed: Oct. 21, 1986

[30] Foreign Application Priority Data

Oct. 28, 1985 [NL] Netherlands .......................... 8502938

[51] Int. Cl.$^4$ .............................................. A01J 3/00
[52] U.S. Cl. ............................... 119/14.17; 119/14.14; 119/14.08
[58] Field of Search ................ 119/14.17, 14.08, 14.14

[56] References Cited

U.S. PATENT DOCUMENTS 4,231,324 11/1980 Schletter ........................... 119/14.17
4,669,307 6/1987 Wakui et al. ...................... 119/14.17

*Primary Examiner*—Paul J. Hirsch
*Assistant Examiner*—J. M. Britt
*Attorney, Agent, or Firm*—Murray Schaffer

[57] ABSTRACT

The milkmeter has a truncated cone shaped float and measuring container with the ratio of the smallest diameters of the truncated cones being equal to the ratio of their largest diameters. The float is suspended by its top. The meter measures accurately constant milk weights irrespective of the quantity of air in the milk. The float is more stable than a cylindrical one and the meter is more accurate because of a very small volume below the float in the rest position.

8 Claims, 1 Drawing Sheet

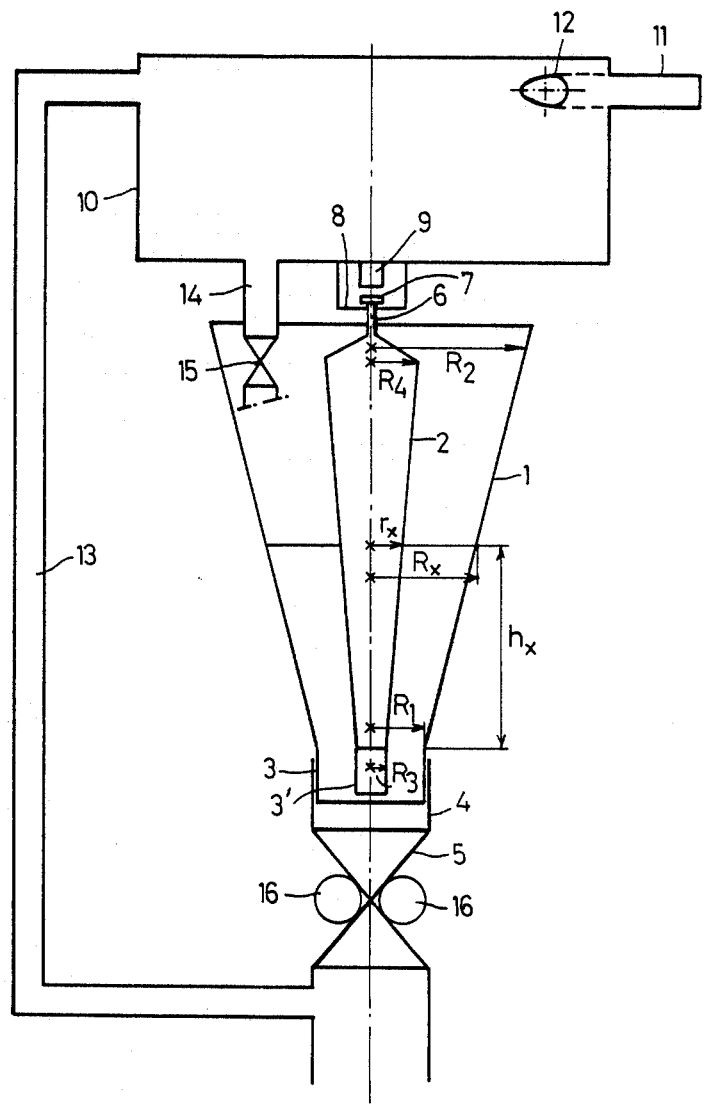

MILKMETER FOR DETERMINING THE WEIGHT OF THE QUANTITY OF MILK ISSUED BY A COW DURING MILKING

BACKGROUND OF THE INVENTION

The invention relates to a milkmeter for determining the weight of the quantity of milk issued by a cow during milking.

The milkmeter comprises a measuring container, a supply valve for supplying the milk to the measuring container and a discharge valve for discharging the milk from the container after the measurement. A vertically movably guided elongated float is located in the container having its upper end cooperating with a proximity switch fixedly mounted on the container. The switch is operable to open the discharge valve and, with some delay, the supply valve for a new measurement provided the float has risen through a height corresponding to a predetermined milk weight in the container.

A similar milkmeter is known from the EP-patent application No. 0052396. In this patent, the float has a prismatic form, particularly a cylindrical form, as well as the container, and the float is vertically movably guided.

SUMMARY OF THE INVENTION

The invention aims at improving the milkmeter. This is achieved according to the invention in that the measuring container and the float are both substantially formed as a truncated cone having a vertical axis with its largest diameter at the upper end. The float guiding means consists of a guide ring situated at the upper end of the float centered about the container axis. The ratio of the smallest diameters of the truncated cones being equal to the ratio of the largest diameters thereof.

The aforementioned diameter ratio guarantees that with each milk level in the container the contents of the immersed float portion is a constant fraction of the milk contents of the container, as will be explained below.

By providing the float as a cone, the center of gravity of the float is at a higher level than with a prismatic float. Thus, the float will float more stably on the milk, i.e. there is less tendency for the float axis to deviate from the vertical under the influence of the movement of the milk as the milk flows into the container. Thereby only an upper guide means for the float is needed because the float will quickly regain its vertical position in the guide means should fluctuation occur. Consequently, no switching errors will occur. Also due to this fact, the meter is no longer dependent on an accurate level position of the container, for its operation.

Due to the omission of any lower guide means the cone shaped float is less exposed to friction, in its vertical movements, than the known prismatic float so that the reaction time is shorter and the measurement becomes more accurate.

Due to the cone shape of the float and the measuring container, the quantity of milk, which is present below the level of the lower float end (and which represents a non-constant weight, see the computation in the above mentioned patent application) is smaller than with the known meter, so that thereby the measurement becomes more accurate. Thus, it is preferable that the diameter of the lower float end is smaller.

For measuring the total milk weight issued by a cow at the time measurement takes place, the container must have a content smaller than the milk quantity which minimally may be expected, in order to permit electronic measurement by the switch. After the measurement has taken place the container must first be drained before the next quantity may be supplied. This is preferable to make the container volume as large as possible since the error due to the non-constant weight below the float as a percentage of the total milk weight likewise then becomes smaller. This requires a larger buffer space into which the milk of the cow flows while the container is draining. In the known meter systems, this is avoided by using two parallely acting containers in one meter, each having its own float.

According to the invention, it is possible due to the small volume below the float to have a larger container volume without any increase in inaccuracy so that a container having a single float is possible. The meter has a central lower discharge opening to which milk is automatically guided by the cone shape so that low discharge friction occurs. The discharge thereby takes less time and less buffering space necessary.

The float and the measuring container of the known meter cannot be manufactured by injection molding in accurately cylindrical shapes since in that case they are not self removing from the mold and the die used therein would be more complicated and more expensive in order to permit removal. Moreover, if the shape is not accurately cylindrical, this also causes an inaccuracy. This disadvantage is eliminated with the cone shape according to the invention.

It is advantageous for quick draining of the measuring container after each measurement, to connect the truncated cone shaped measuring container at its lower end coaxially to a discharge conduit which may be opened and closed respectively through a pneumatically or electromagnetically actuable valve.

Preferably the discharge conduit is a resilient hose and the valve is a pinching valve, symmetrically closing the hose and operating in the direction transverse to the hose axis.

In a practical embodiment the upper end of the cone shaped float has a coaxially pin shaped portion around which a stationary guide ring is mounted. A disc is secured to the upper end of the pin shaped portion and cooperates with the proximity switch as the float rises. The float, in the inoperative condition, is supported through the disc resting on the guide ring.

Preferably the proximity switch is a linear switch which continues to carry out linear measurement as the upwardly floating stroke continues due to milk flowing into the container after the float has operated the switch, so that this last quantity is also registered.

It is preferable, that the measuring container has a T-fitting provided at the milk inflow opening, whereby the milk is tangentially supplied in two opposite directions simultaneously. With tangential flow due to the cone shape of the measuring container the centrifugal force on the milk increases in downward direction whereby the air may more easily leave the milk. Although the presence of air has only a negligible influence on the measurement of the weight the air causes foaming, which in extreme condition could cause adhesion of the float to the container wall, to the guide means or to the switch and thereby cause a measuring error.

The two-sided supply provided by the T-fitting serves for avoiding swirling of the milk when flowing into the container, particularly in connection with the cone shape, which swirling would normally cause the milk level to be irregular resulting in a measuring error. Also the two-sided supply causes less damage to the milk.

Due to the cone shape of container and float, the milk, during the last part of the discharge from the container, has a larger free upper surface than with a cylindrical container so that also thereby better deaeration is obtained.

Instead of a cone shape, the float and measuring container may be in the shape of truncated pyramids, having similar cross-sections.

BRIEF DESCRIPTION OF THE DRAWINGS

The invention will be further explained below with reference to the drawing showing in its single FIGURE a schematic embodiment of the invention.

DESCRIPTION OF THE INVENTION

According to the present invention, the meter has a measuring container 1 shaped as a truncated cone. The radius of the lower limiting circle of the truncated cone is indicated R1, that of the upper circle R2. Coaxially with the container 1 is a float 2 being a truncated cone shape, the radius of the lower limiting circle of the float being indicated R3 and that of the upper circle of the truncated part R4.

The measuring container 1 is extended at its lower end by a cylindrical portion 3 having a diameter equal to its lower limiting circle R1. A conduit, such as a hose 4, is connected with the lower end 3 for discharging the milk. The hose is adapted to be closed and opened by a valve 5, schematically shown. The lower end of the float is extended with a cylindrical portion 3′, which corresponds to the cylinder-shaped discharge portion 3 of the measuring container. In this manner the milk volume below the float 2 is reduced to a minimum.

The upper end of the float 2 is extended via a tapered portion by a pin shaped portion 6, carrying at its upper end a disc 7. The float 2 is supported by this disc 7 in its inoperative, i.e. lower position, as shown, on a guide ring 8, which is secured to a supporting portion of the meter above the measuring container. The disc 7, apart from functioning to support the float 2, also serves to guide the float in its vertical movement under the influence of the upward force imparted to the float by the milk supplied to the container. Coaxial with and over the disc 7 is mounted a proximity switch 9, for example such as a Hall-switch.

In the embodiment shown, the guide ring 8 and the switch 9 are secured to the bottom of a buffering reservoir 10 to which milk may be supplied through a connecting conduit 11 from a source (not shown) connected therewith. The conduit 11 has an opening 12 in the reservoir 10. Preferably the conduit 11 is provided tangentially with respect to the buffering reservoir 10 so that the milk initially enters the reservoir along its wall, so as to permit release from the milk as much of the air present therein, as is possible. An air conduit 13 is provided between the buffering reservoir 10 and the discharge hose 4 beyond the valve 5. So that pressure equalization can take place between the buffering reservoir 10 and the hose 4 and thereby also in the measuring container 1 consequently measurement is executed exclusively under the influence of gravity and is not influenced by any possible pressure differences.

The buffering reservoir 10 has a discharge outlet 14 including a discharge valve 15 at its lower end. The valves 5 and 15 are actuated through the switch 9 by means of electronic control means (not shown).

The meter operates as follows:

When the valve 15 is opened, milk, which was present in the container 10, flows into the measuring container 1 and ascends therein, since simultaneously the valve 5 has been closed. At the moment in which the level of the milk in the container 1 is such that the portion of the float 2, immersed in the milk, has a volume equal to that of a quantity of milk, the weight of which is equal to the weight of the float, the float experiences an upward force and rises upwardly. The rising float causes the disc 7 to move nearer to the switch 9, which on contact with the disc 7, issues a signal whereby the valve 15 is closed and simultaneously the valve 5 is opened. The milk present in the container 1 is then drained into a receiving container (not shown) through the hose 4.

Since at each milk level the immersed portion of the float has a volume with is a constant fraction of the volume of the container in which the milk is received, the container contains a constant weight of milk, which is registered as such by a counter (not shown).

As described in the above mentioned patent application the weight present in the container each time the switch is activated is independent of the specific weight of the milk, i.e. of the quantity of air present in the milk. The level container 1 will, at the switching moment, be higher with a smaller specific weight of the milk than with a larger specific weight, but the weight of the milk in the container is equal each time the switch is operated.

It will now be shown that the ratio between the contents of the measuring container 1 and the volume of the immersed portion of the float 2 is, at each milk level, equal if the respective ratio of the smallest diameters of the truncated cones is equal to that of the largest diameters thereof, or if R1:R3=R2:R4.

This ratio is present when the apexes of the cones from which the said truncated cones have been derived coincide. That ratio also applies at an arbitrary height, and therefore with each milk level h. If one assumes (see the FIGURE) that the float radius at the level $h = r_x$ and that of the container $R_x$, then the following equation applies:

The contents of the measuring container at the height $h \cdot \frac{1}{3}\pi h\,(R1^2 + R_x^2 + R1R_x)$ and that of the float at this level $= \frac{1}{3}\pi h\,(R3^2 + r_x^2 + R3r_x)$.

If one indicates R1: R3 by $\sqrt{x}$ then $R1^2/R3^2 = R_x^2/r_x^2 \cdot R_x/r_x = x$ so that the container contents always is a factor x times the float contents.

Preferably the supply valve 14 is a T-shaped discharge fitting (not shown) whereby the milk may be applied simultaneously tangentially in two opposite directions.

The valve 5 is preferably a symmetrically closing pinching valve acting transverse to the hose axis. To close the valve, two cylindrical valve closure means 16, schematically indicated in the figure, are provided so as to be moved towards each other.

The switch 9 may be a linear Hall-switch which switches as soon as the milk level corresponds to the required weight, but continues to provide a signal thereafter, and includes a timing delay so that prior to the closing of the supply valve 15 by the switching signal, some milk will continue to flow into the container whereby the float further rises. The lineary rising distance of the disc 7 is in that case also registered by the switch.

In the buffering reservoir 10 a quantity of milk is always present when the supply valve 15 is opened, so that a practically constant supply velocity through the valve 15 is guaranteed.

What is claimed is:

1. Milkmeter for determining the weight of the quantity of milk issued by a cow during milking, comprising a measuring container, a supply valve for supplying the milk to the measuring container and a discharge valve for discharging the milk from the measuring container after the measurement, and a vertically movably guided elongated float in the container, the upper end of the float cooperating with a proximity switch fixedly mounted over the upper end of the float, said switch being operable on the float rising to a height corresponding to a predetermined weight of milk in said container, for opening the discharge valve to discharge the milk from said container and, with a certain delay, for opening the supply valve for supplying fresh milk to said container for a new measurement, said measuring container and said float being both substantially shaped as a truncated cone having a vertical axis with the largest diameter at the upper end, and said float guiding means comprises a guide ring concentric with the upper end of the float, the ratio of the smallest diameters (R1:R3) of said truncated cones being equal to the ratio of the largest diameters thereof (R2:R4).

2. The milkmeter according to claim 1 wherein the supply valve has a T-piece whereby the milk is supplied tangentially to said container simultaneously in two directions.

3. The milkmeter according to claim 1 wherein the truncated cone shaped measuring container is at its lower end coaxially connected to a discharge conduit, having a pneumatically operable valve for selectively opening and closing said conduit which may be opened and closed respectively through a pneumatically or magnetically actuatable valve.

4. The milkmeter according to claim 1 wherein the truncated cone shaped measuring container is at its lower end coaxially connected to a discharge conduit, having a magnetically operable valve for selectively opening and closing said conduit which may be opened and closed respectively through a pneumatically or magnetically actuatable valve.

5. The milkmeter according to claim 1 wherein the discharge conduit is a resilient hose and the valve is a pinch valve symmetrically closing and acting transverse to the axis of the hose.

6. The milkmeter according to claim 4 wherein the truncated cone shaped measuring container is at its lower end coaxially connected to a discharge conduit, having a magnetically operable valve for selectively opening and closing said conduit which may be opened and closed respectively through a pneumatically or magnetically actuatable valve.

7. The milkmeter according to any of claims 2-5 wherein the truncated cone shaped float has a coaxially extended pin-shaped portion around which a stationary guide ring engages, and includes a disc at the upper end of the pin-shaped portion cooperating with the proximity switch, the float being supported in its inoperative condition by said disc on the guide ring.

8. The milkmeter according to claim 6 wherein the proximity switch is a linear switch, which after having been actuated by the float, linearly measures the further rising distance which occurs due to milk flowing into said container after the switching moment and thereby also registers said last-mentioned quantity.

* * * * *